(12) United States Patent
Cheo et al.

(10) Patent No.: US 9,796,147 B2
(45) Date of Patent: Oct. 24, 2017

(54) PORTABLE ELECTRONIC DEVICE DISPLAY ASSEMBLIES AND METHODS AND APPARATUS FOR MANUFACTURING THE SAME

(71) Applicant: Google Technology Holdings LLC, Mountain View, CA (US)

(72) Inventors: Francis C. Cheo, Vernon Hills, IL (US); Anthony P. Gallagher, Carpentersville, IL (US); David K. Lim, Green Oaks, IL (US); Jason P. Wojack, Libertyville, IL (US); Weihong Zhang, Kildeer, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 480 days.

(21) Appl. No.: 14/280,704

(22) Filed: May 19, 2014

(65) Prior Publication Data

US 2014/0347824 A1 Nov. 27, 2014

Related U.S. Application Data

(60) Provisional application No. 61/826,297, filed on May 22, 2013.

(51) Int. Cl.
*B29D 11/00* (2006.01)
*G02F 1/13* (2006.01)
*G02F 1/1333* (2006.01)

(52) U.S. Cl.
CPC .... *B29D 11/0073* (2013.01); *G02F 1/133308* (2013.01); *G02F 2001/13332* (2013.01); *G02F 2001/133325* (2013.01); *G02F 2001/133331* (2013.01); *G02F 2202/28* (2013.01)

(58) Field of Classification Search
CPC ..... G02F 1/133308; G02F 2001/13332; G02F 2001/133325; G02F 2001/133331; G02F 2202/28; Y10T 428/26; G06F 1/1656; H05K 5/0017; B29D 11/0073
USPC ...................................... 361/679.26
See application file for complete search history.

(56) References Cited

U.S. PATENT DOCUMENTS

| 5,828,427 | A | * | 10/1998 | Faris | ................. G06F 1/1626 348/E13.007 |
| 8,773,624 | B2 | * | 7/2014 | Shinya | ................. C09J 109/00 349/122 |
| 2004/0160558 | A1 | * | 8/2004 | Kim | ................. G02F 1/133528 349/117 |
| 2009/0162645 | A1 | | 6/2009 | Matsuhira | |

(Continued)

*Primary Examiner* — Eric Thomas
*Assistant Examiner* — Michael P McFadden
(74) *Attorney, Agent, or Firm* — Brake Hughes Bellermann LLP

(57) ABSTRACT

A display includes an upper surface adapted to present visual information to a device user and an outer perimeter proximate the upper surface. An optically transparent lens is carried by a housing and overlies the display. The optically transparent lens and the upper portion of the housing together define an upper surface of the portable electronic device. An optically transparent resin is carried between the display and the optically transparent lens. The optically transparent resin includes a perimeter portion disposed between the outer perimeter of the display and the side portion of the housing. The resin can be cured using light.

16 Claims, 13 Drawing Sheets

(56) References Cited

U.S. PATENT DOCUMENTS

| | | | |
|---|---|---|---|
| 2010/0097552 A1* | 4/2010 | Shinya | C09J 109/00 349/122 |
| 2011/0261002 A1* | 10/2011 | Verthein | G06F 1/181 345/174 |
| 2012/0081874 A1 | 4/2012 | Wu et al. | |
| 2012/0145928 A1 | 6/2012 | Wang et al. | |
| 2012/0206896 A1* | 8/2012 | Suzuki | G06F 1/1641 361/807 |
| 2013/0002133 A1* | 1/2013 | Jin | G06F 1/1626 313/511 |
| 2014/0071596 A1* | 3/2014 | Shukla | G06F 1/1656 361/679.01 |

* cited by examiner

PORTABLE ELECTRONIC DEVICE DISPLAY ASSEMBLIES AND METHODS AND APPARATUS FOR MANUFACTURING THE SAME

TECHNICAL FIELD

The present disclosure generally relates to portable electronic device display assemblies including optically transparent adhesive resins and methods and apparatus for manufacturing the same. In particular, the present disclosure relates to portable electronic device display assemblies including insert molded housings and optically transparent adhesive resins and methods and apparatus for manufacturing the same.

BACKGROUND

Many types of portable electronic devices, such as cellular telephones, tablet computers, and the like, include display panels that are disposed beneath additional components. For example, some devices include polarizing panels and upper protective "glass" panels or lenses that overlie display panels. In some cases, intervening optically transparent adhesive resins or optically clear resins (OCRs) connect display panels to overlying lenses.

During manufacturing, an optically transparent resin is typically applied to a display panel in an uncured liquid state. The overlying lens is then aligned relative to the display panel and applied to the optically transparent resin. The optically transparent resin flows or "wets out" to occupy the remainder of the space between the display panel and the lens. One or more "initial" curing lamps direct ultraviolet light laterally toward the exposed perimeters of the lens and the display panel (that is, parallel to the viewing surface of the display panel). The ultraviolet light cures or "freezes" the optically transparent resin as the resin approaches the perimeters of the lens and the display panel to initially secure the components to one another. One or more "main" curing lamps then direct ultraviolet light through the lens to cure the remainder of the optically transparent resin and secure the display panel to the lens. The lens and display panel are then connected to a device housing, additional electronic components, and the like.

DETAILED DESCRIPTION OF EXEMPLARY EMBODIMENTS

Figure 1:
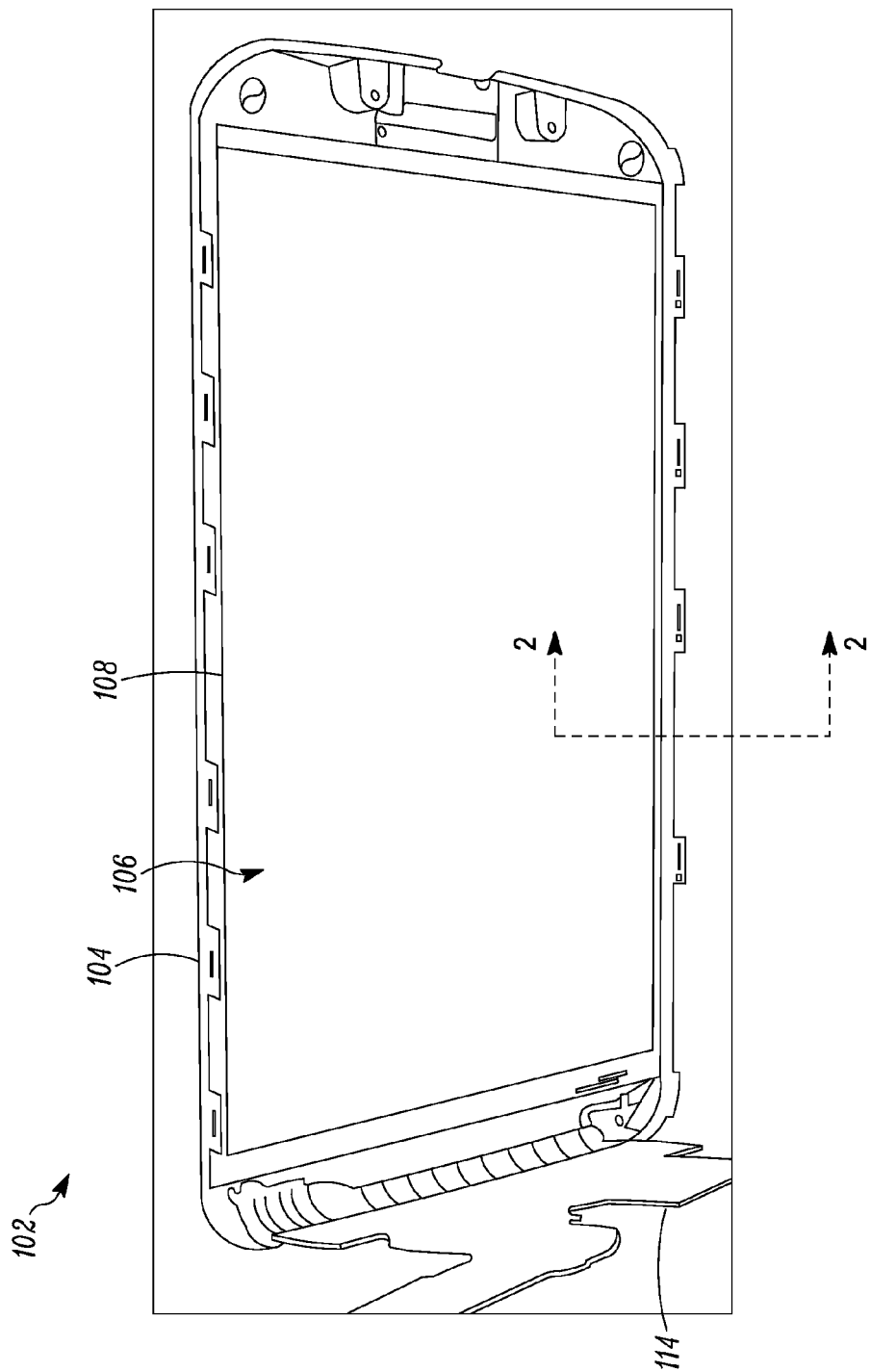
FIG. 1 is a lower perspective view of an example portable electronic device display assembly.

Known methods of applying and curing optically transparent resins can not be employed for all portable electronic device display assemblies. Glass insert molded housing and lens assemblies may include both an overlying optically transparent lens and a portion of an optically opaque device housing. For example, the device housing may be disposed about the perimeter of the lens and extend downwardly to define a chamber for receiving the lens assembly and other device components. The interface between the lens and the housing can have an aesthetically pleasing "seamless" appearance that inhibits egress of dust and debris into the electronic device. However, an optically transparent resin applied to the glass insert molded housing and lens assemblies can not be UV cured due to the presence of the housing. That is, the housing interferes with curing the optically transparent resin at the perimeter of the display panel.

In a specific embodiment, a portable electronic device display assembly includes a housing. The housing includes an upper portion and a side portion coupled to the upper portion. A display is carried within the housing, and the display includes an upper surface adapted to present visual information to a device user. An outer perimeter is proximate the upper surface. An optically transparent lens is carried by the housing and overlies the display. The optically transparent lens and the upper portion of the housing together define an upper surface of the portable electronic device display assembly. An optically transparent resin couples the display to the optically transparent lens. The optically transparent resin includes a perimeter portion disposed between the outer perimeter of the display and the side portion of the housing.

In some exemplary embodiments, the optically transparent resin further includes an upper portion coupled to the perimeter portion and disposed between the display and the optically transparent lens. In some exemplary embodiments, the display includes a display panel and a polarizing panel disposed atop the display panel, and the upper portion of the optically transparent resin is disposed aside the polarizing panel. In some exemplary embodiments, the upper portion of the housing overlies the outer perimeter of the display. In some exemplary embodiments, the optically transparent lens is molded to the housing.

In some embodiments, a portable electronic device display assembly includes a housing and an optically transparent lens carried by the housing. The optically transparent lens includes a lens outer perimeter. A display is carried within the housing beneath the optically transparent lens. The display includes a display panel adapted to present visual information to a device user. The display further includes a polarizing panel overlying the display panel. The polarizing panel includes a polarizing panel outer perimeter disposed inwardly relative to the lens outer perimeter. An optically transparent resin couples the display to the optically transparent lens.

In some exemplary embodiments, the display panel includes a display panel outer perimeter, and the optically transparent resin includes a perimeter portion disposed between the display panel outer perimeter and the housing. In some exemplary embodiments, the housing includes a side portion and an upper portion coupled to the side portion. The upper portion and the optically transparent lens define an upper surface of the portable electronic device display assembly.

In some embodiments, a method of manufacturing a portable electronic device display assembly including a display and a housing, the display having an upper surface and an outer perimeter proximate the upper surface, and the housing being coupled to an optically transparent lens having a lower surface disposed within the housing, includes positioning the display and an uncured optically transparent resin within the housing such that the uncured optically transparent resin is disposed between the upper surface of the display and the lower surface of the optically transparent lens, and such that a gap separates the outer perimeter of the display from the housing. The housing and the optically transparent lens are displaced relative to the display such that an overflow portion of the uncured optically transparent resin flows into the gap. The overflow portion of the uncured optically transparent resin is cured within the gap.

In some exemplary embodiments, the method includes coupling the optically transparent lens to the housing by positioning the optically transparent lens in an injection molding cavity, injecting a molten polymer into the injection molding cavity to engage the optically transparent lens, and permitting the molten polymer to solidify while being engaged with the optically transparent lens. In some exemplary embodiments, curing the overflow portion within the gap includes applying a light curing treatment to the overflow portion. In some exemplary embodiments, the light curing treatment is an ultraviolet light curing treatment. In some exemplary embodiments, the optically transparent lens and the housing together define an upper surface of the portable electronic device display assembly, and applying the light curing treatment includes directing light in a direction that is substantially perpendicular to the upper surface. In some exemplary embodiments, the display includes a display panel and a polarizing panel disposed atop the display panel, and applying the light curing treatment includes applying the light curing treatment to a portion of the uncured optically transparent resin disposed between the display panel and the optically transparent lens and aside the polarizing panel to cure the portion of the uncured optically transparent resin and secure the display to the optically transparent lens. In some exemplary embodiments, the method includes curing a portion of the uncured optically transparent resin disposed between the upper surface of the display and the lower surface of the optically transparent lens to secure the display to the optically transparent lens.

In some embodiments, an apparatus for curing an optically transparent resin within a portable electronic device display assembly includes a frame having a support surface adapted to support the portable electronic device display assembly. At least one light source is carried by the frame and is adapted to emit curing light. The frame includes at least one opening that is adapted to receive the curing light and direct the curing light in a direction substantially perpendicular to the support surface and toward the optically transparent resin within the portable electronic device display assembly.

In some exemplary embodiments, the frame includes a plurality of openings adapted to receive the curing light and direct the curing light in the direction substantially perpendicular to the support surface and toward the optically transparent resin within the portable electronic device display assembly. In some exemplary embodiments, the frame includes four side walls, and each of the four side walls includes at least one opening adapted to receive the curing light and direct the curing light in the direction substantially perpendicular to the support surface and toward the optically transparent resin within the portable electronic device display assembly. In some exemplary embodiments, the frame includes an inner fixture surrounded by the four side walls, and the inner fixture includes the support surface of the frame. In some exemplary embodiments, the at least one opening is adapted to receive the curing light and direct the curing light upwardly toward the optically transparent resin within the portable electronic device display assembly.

In some embodiments, a portable electronic device includes a display assembly. The display assembly includes a housing having an upper portion and a side portion coupled to the upper portion. A display is carried within the housing. The display includes an upper surface adapted to present visual information to a device user and an outer perimeter proximate the upper surface. An optically transparent lens is carried by the housing and overlies the display. The optically transparent lens and the upper portion of the housing together define an upper surface of the portable electronic device. An optically transparent resin couples the display to the optically transparent lens. The optically transparent resin includes a perimeter portion disposed between the outer perimeter of the display and the side portion of the housing.

Figure 2:
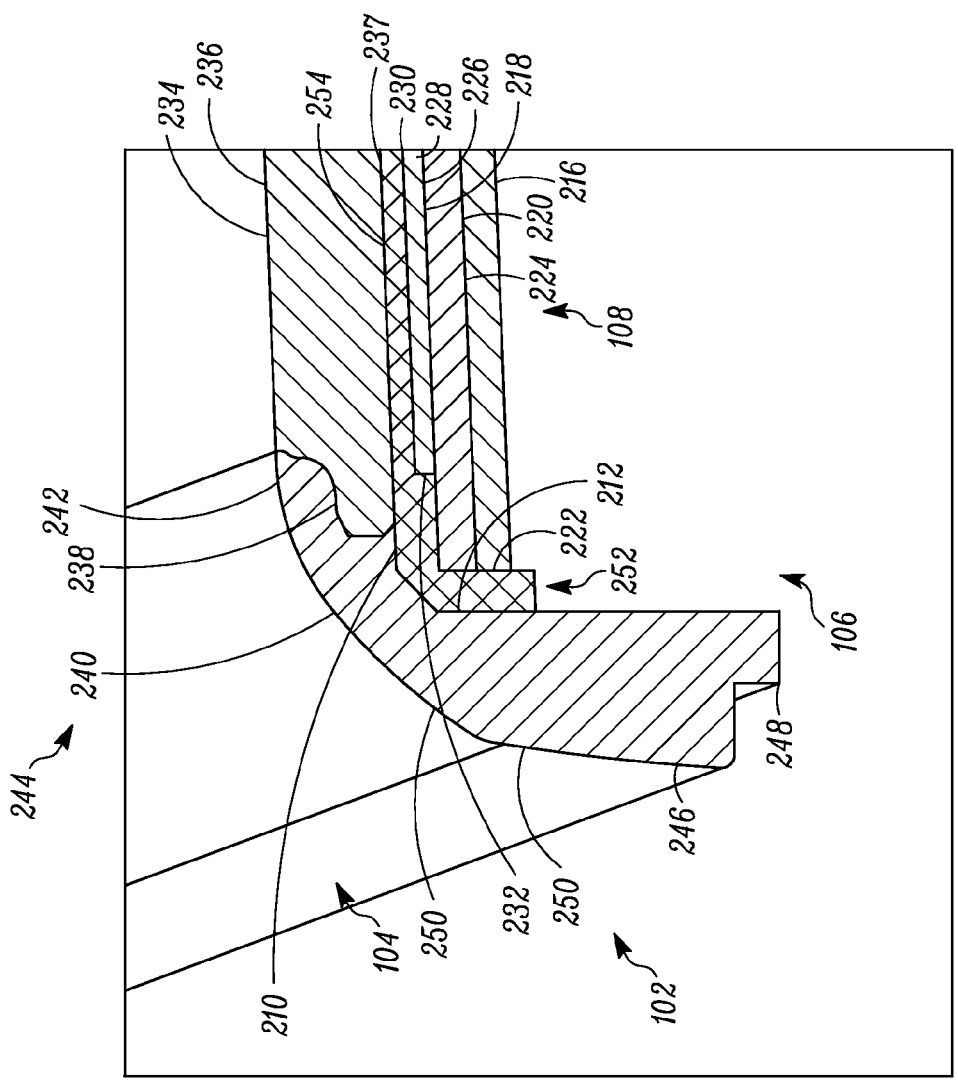
FIG. 2 is a perspective section view of the portable electronic device display assembly along line 2-2 of FIG. 1.
Figure 3:
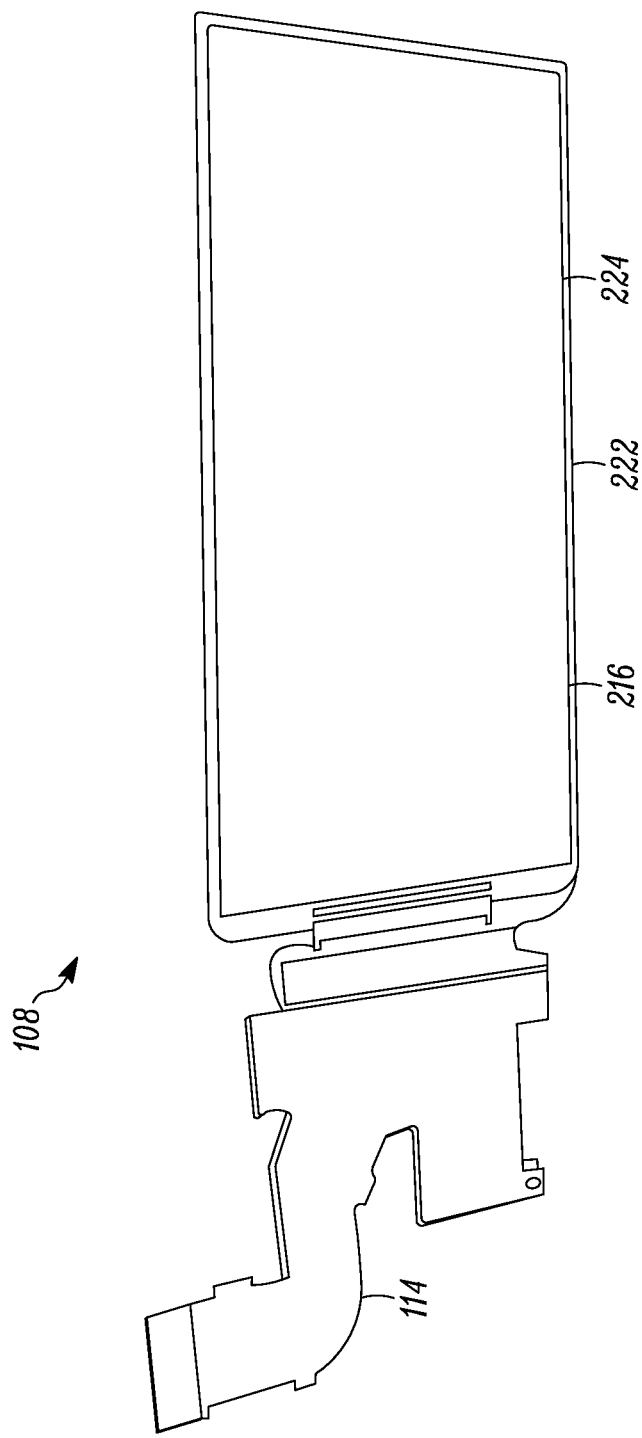
FIG. 3 is a lower perspective view of a display of the portable electronic device display assembly of FIG. 1.
Figure 4:
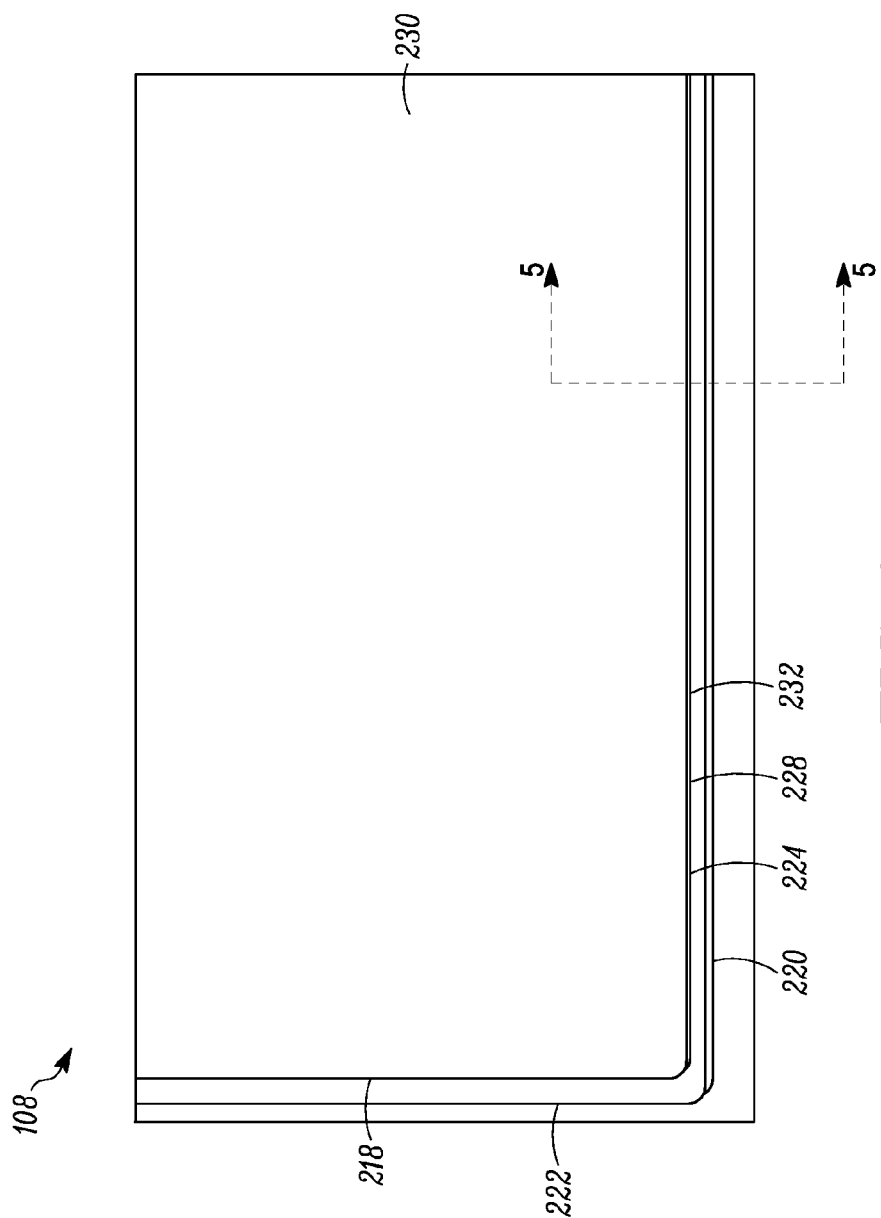
FIG. 4 is a top detail view of the display of FIG. 3.
Figure 5:
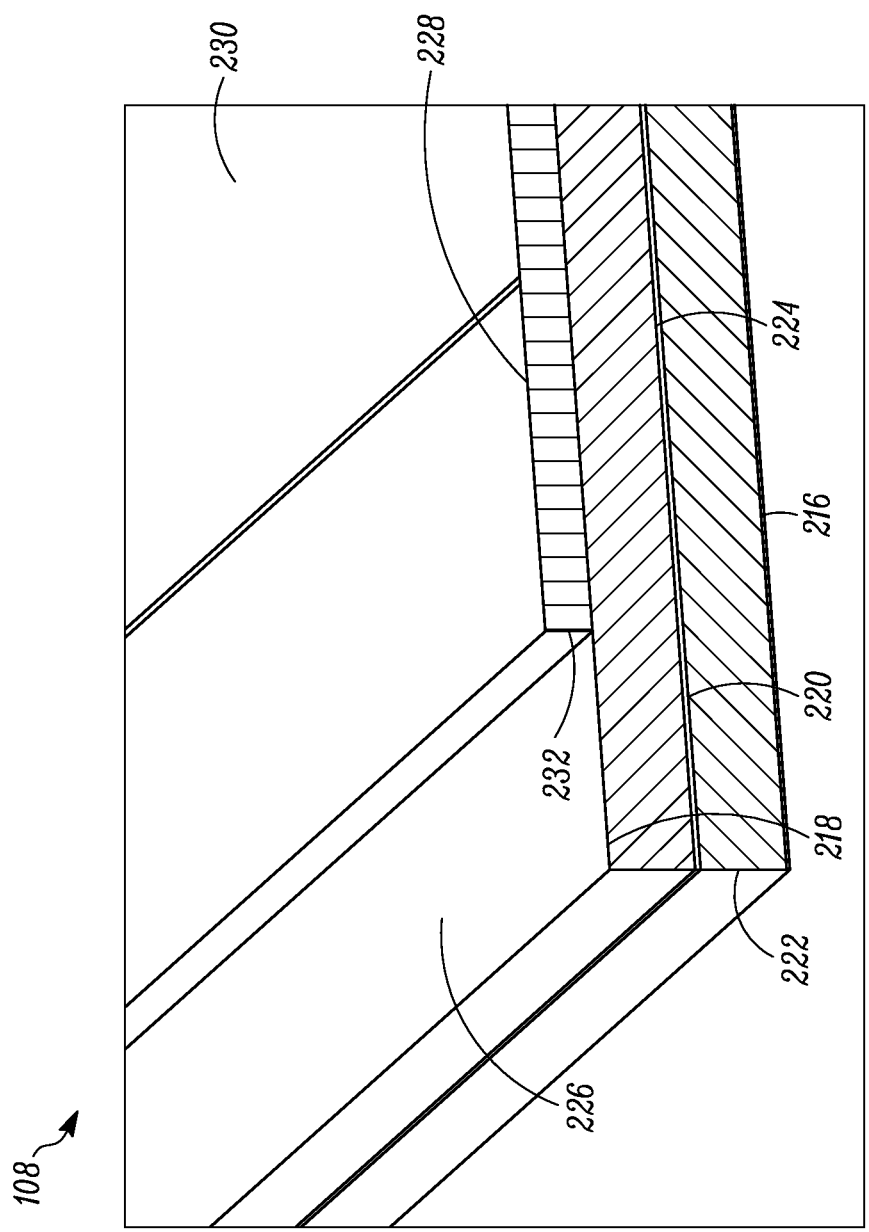
FIG. 5 is a perspective section view of the display along line 5-5 of FIG. 4.

Turning now to the drawings, an exemplary embodiment of the presently disclosed portable electronic device display assembly 102 is illustrated in FIGS. 1 and 2. The display assembly 102 generally includes a housing and lens assembly 104 that may be formed, in some embodiments, in an insert molding process. The housing and lens assembly 104 defines an internal chamber 106 that houses a display 108. The display 108 is coupled to the housing and lens assembly 104 by an optically transparent resin 210. Along one or more of the sides of the portable electronic device display assembly 102, the optically transparent resin 210 includes a perimeter or "overflow" portion 212 that is disposed between the housing and lens assembly 104 and the outer perimeter of the display 108. In some embodiments, the overflow portion 212 may be cured by an ultraviolet light source. In addition to securing the housing and lens assembly 104 to the outer perimeter of the display 108, the overflow portion 212 provides a cushion between the housing and lens assembly 104 and the display 108 to absorb impact forces transmitted from the housing and lens assembly 104 to the display 108. The aspects and details of these components are explained in further detail below.

The portable electronic device display assembly 102 may be a component of any of various types of devices capable of receiving and/or transmitting electrical power and/or electrical communication/data signals (that is, portable electronic devices), such as a cellular telephone 1300 (see FIG. 13), a tablet computer, a notebook computer, a personal digital assistant (PDA), a digital media player, a digital camera, a peripheral device (such as a printer, a scanner, a web camera), or the like. In some embodiments, the portable electronic device display assembly 102 operatively connects to electronic circuitry (not shown) that facilitates performing actions via the electronic device (for example, placing telephone calls, browsing the Internet, and the like). In particular, the electronic circuitry may include a processor, a memory device, communication buses, and the like.

Referring now to FIGS. 1-5, the display 108 may generally be any of various types of displays. In some embodiments, for example, the display 108 is a touch-sensitive, organic light-emitting diode (OLED) display. Any suitable display can be used, such as a liquid crystal display (LCD), and the display may include a capacitive or resistive touch sensor, or no touch sensor. The display 108 also includes one or more electrical connectors 114 that operatively connect the display 108 to the electronic circuitry described above.

In some embodiments, the display 108 includes a lower display panel 216 and an upper display panel 218 that are adapted to present visual information to a device user. The panels 216 and 218 are connected by a hermetically sealing, frit or bond 220 disposed between the panels 216 and 218 and proximate an outer perimeter 222 of the panels 216 and 218. The panels 216 and 218 define an opaque display portion 224 inwardly of the frit or bond 220. The display portion 224 is adapted to present visual information through an upper surface 226 of the upper display panel 218.

In some embodiments, the display 108 includes a polarizing filter or panel 228 that overlies the upper display panel 218. The polarizing panel 228 includes an upper surface 230 through which visual information is presented. Proximate the upper surface 230, the polarizing panel 228 includes an outer perimeter 232. The polarizing panel outer perimeter 232 is disposed inwardly relative to the display panel outer perimeter 222 (for example, by 0.7 mm to 1.0 mm). This construction, as described in further detail below, facilitates initially curing the optically transparent resin 210 during manufacturing.

Figure 6:
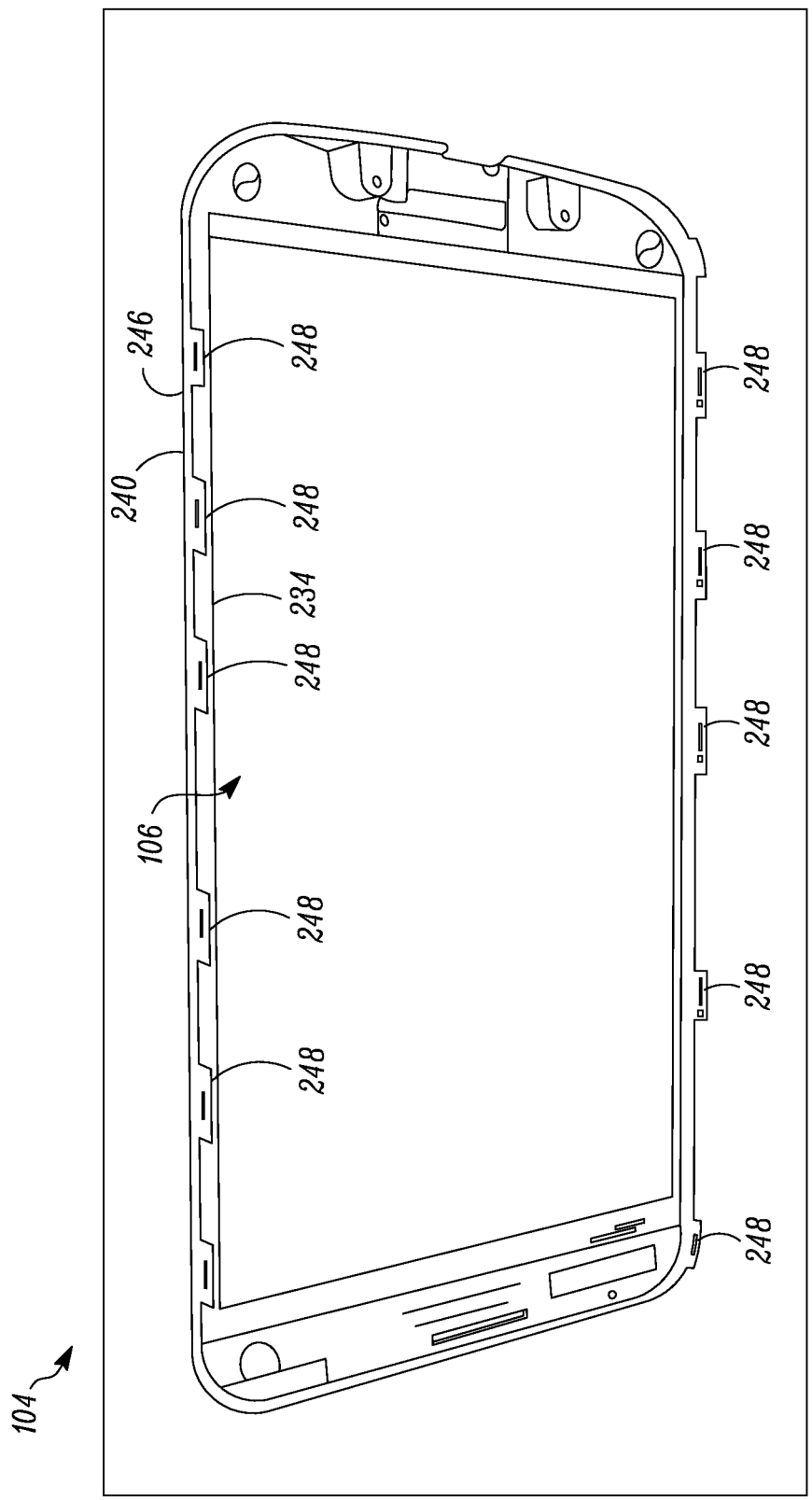
FIG. 6 is a lower perspective view of a housing and lens assembly of the portable electronic device display assembly of FIG. 1.

Referring to FIGS. 1, 2, and 6, the housing and lens assembly 104 may be formed, in some embodiments and as described in further detail below, in an insert molding process. The housing and lens assembly 104 includes an optically transparent lens 234 that overlies the display 108. The lens 234 may include any of various materials, such as plastics, glass, and the like. The lens 234 includes an upper surface 236 and a lower surface 237 through which visual information is presented. Proximate the upper surface 236, the lens 234 includes an outer perimeter 238. In some embodiments, at least a portion of the lens outer perimeter 238 is disposed outwardly from the polarizing panel outer perimeter 232. This construction, as described in further detail below, facilitates initially curing the optically transparent resin 210 and securing the resin 210 to the lens 234 during manufacturing. The lens outer perimeter 238 may include a variety of shapes. In some embodiments and as shown in the figures, the lens outer perimeter 238 may be shaped to inhibit detachment of the lens 234 from an adjacent housing 240.

The housing 240 is an optically opaque component and may include any of various materials, such as plastics, metals, or the like. The housing 240 may be structured as shown in the figures and as described below along one or more of the sides of the portable electronic device display assembly 102. For example, in some embodiments, the housing 240 may be disposed along two sides of the portable electronic device display assembly 102 and omitted from two other sides of the portable electronic device display assembly 102.

The example housing 240 generally forms a "bucket" that, together with the lens 234, defines the internal chamber 106 for receiving the display 108. The housing 240 includes an upper portion 242 that engages the lens outer perimeter 238. The upper portion 242, together with the lens 234, defines an upper surface 244 of the portable electronic device display assembly 102. In some embodiments and as shown in the figures, the upper portion 242 overlies the display panel outer perimeter 222. In some embodiments and also as shown in the figures, the upper portion 242 overlies the polarizing panel outer perimeter 232. The upper portion 242 also connects to a side portion 246 of the housing 240.

The side portion 246 extends downwardly from the upper portion 242 and away from the lens 234. The side portion 246 may include one or more attachment features 248 (for example, snap hook-receiving openings) that connect the housing 240 to a second or lower housing (not shown).

Together, in some embodiments, the side portion 246 and the upper portion 242 together define one or more curved surfaces 250 that provide the portable electronic device with an aesthetically pleasing appearance. The side portion 246 and the upper portion 242 are sized to define a gap 252 between the housing 240 and the display 108. The gap 252 houses the optically transparent resin 210.

Referring again to FIG. 2, the optically transparent resin 210 may be any of various resins capable of securing the display 108 to the lens 234, such as acrylic-based resins, silicon-based resins, and the like. After assembling the above components and curing the resin 210, the resin 210 includes an upper portion 254 disposed between the display 108 and the optically transparent lens 234. Part of the upper portion 254 is disposed aside the polarizing panel outer perimeter 232 to facilitate initial curing of the resin 210 and to secure the display 108 to the lens 234. The upper portion 254 connects to the perimeter or "overflow" portion 212, which extends from the upper portion 254 in a direction that is substantially perpendicular to the upper surface 244 of the assembly 102 (for example, the perimeter portion 212 may extend downwardly from the upper portion 254). The perimeter portion 212 is disposed between the display panel outer perimeter 222 and the side portion 246 of the housing 240 (that is, disposed within the gap 252). As described in further detail below, the perimeter portion 212 may be cured by a top-lit ultraviolet light source as the resin 210 flows in the gap 252. In some embodiments, the perimeter portion 212 secures the housing and lens assembly 104 to the outer perimeter of the display 108. In some embodiments, the perimeter portion 212 also provides a cushion between the housing and lens assembly 104 and the display 108 to absorb impact forces transmitted from the housing and lens assembly 104 to the display 108.

Figure 7:
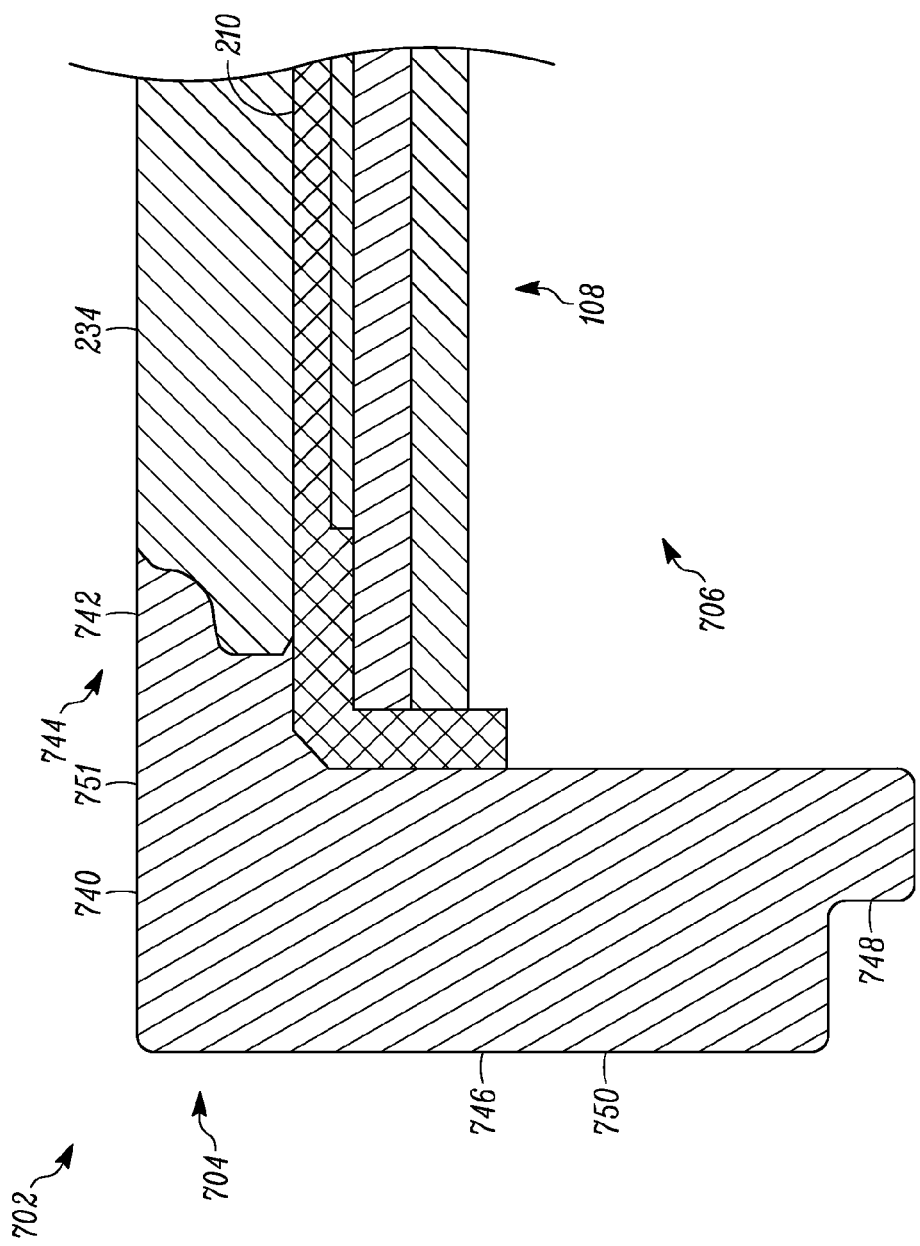
FIG. 7 is a section view of an example portable electronic device display assembly.

FIG. 7 illustrates another exemplary embodiment of a portable electronic device display assembly 702. The portable electronic device display assembly 702 includes a display 108 and an optically transparent resin 210 that may be generally as described above. The portable electronic device display assembly 702 also includes a housing and lens assembly 704 that may be formed, in some embodiments and as described in further detail below, in an insert molding process. The housing and lens assembly 704 includes a lens 234 that may be generally as described above. The lens 234 connects to an adjacent housing 740.

The example housing 740 is an optically opaque component and may include any of various materials, such as plastics, metals, and the like. The housing 740 generally has a "bucket" shape that, together with the lens 234, defines an internal chamber 706 for receiving the display 108. The housing 740 includes an upper portion 742 that engages the lens 234. The upper portion 742, together with the lens 234, defines an upper surface 744 of the portable electronic device display assembly 702. In some embodiments and as shown in the figures, the upper portion 742 overlies the perimeter of the display 108. The upper portion 742 also connects to a side portion 746 of the housing 740.

The side portion 746 extends downwardly from the upper portion 742 and away from the lens 234. The side portion 746 may include one or more attachment features 748 (for example, snap hook-receiving openings) that connect the housing 740 to a second or lower housing (not shown).

The side portion 746 and the upper portion 742 include flat outwardly facing surfaces 750 and 751, respectively, to provide the portable electronic device with a flat or "box-like" appearance.

Figure 8:
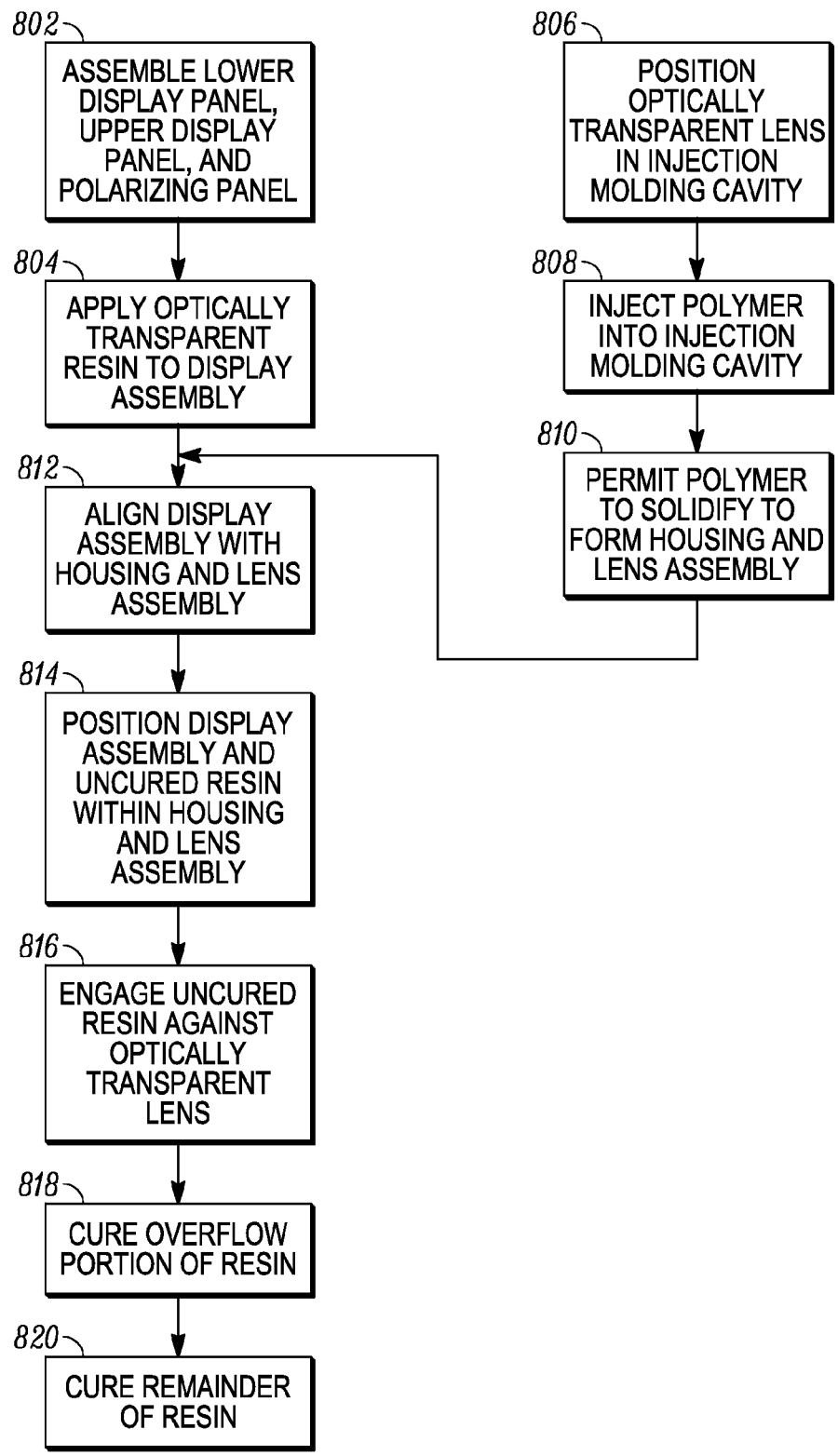
FIG. 8 is a flowchart of an example method of manufacturing an portable electronic device display assembly.

FIG. 8 illustrates a flowchart of an example method of manufacturing portable electronic device display assemblies, such as the portable electronic device display assemblies 102 and 702 described above. The following description of the method only refers to the portable electronic device display assembly 102, although it is to be understood that the same general description also applies to the portable electronic device display assembly 702. The method begins at block 802 by assembling the lower display panel 216, the upper display panel 218, and the polarizing panel 228. In some embodiments, block 802 may be carried out at a first facility and the lower display panel 216, the upper display panel 218, and the polarizing panel 228 may be provided to a second facility in a pre-assembled configuration. At block 804, the optically transparent resin 210 is applied to the upper surface of the display 108 (specifically, the upper surface 230 of the polarizing panel 228) in an uncured liquid state.

At blocks 806, 808, and 810, the housing and lens assembly 104 is formed in an insert molding process. That is, at block 806 the optically transparent lens 234 is positioned in an injection molding cavity (not shown) that generally has the inverse shape as the housing 240. At block 808, molten polymer (not shown), such as a thermopolymer, is injected into the injection molding cavity and engages the optically transparent lens 234. At block 810, the polymer is permitted to cool and solidify in the injection molding cavity while the polymer is engaged with the optically transparent lens 234 to form the housing and lens assembly 104. Blocks 806, 808, and 810 may be carried out prior to, simultaneously with, or after blocks 802 and 804. In some embodiments, blocks 806, 808, and 810 may be carried out at a first facility and the housing and lens assembly 104 may be provided to a second facility.

At block 812, the display 108 is initially aligned relative to the housing and lens assembly 104 by using, for example, a machine vision system (not shown). In some embodiments, the housing and lens assembly 104 is initially aligned relative to the display 108 by positioning the housing and lens assembly 104 above the display 108. At block 814, the display 108 and the uncured optically transparent resin 210 are positioned within the housing and lens assembly 104. In some embodiments, the housing and lens assembly 104 is displaced vertically relative to the display 108 to receive the display 108. Due to their alignment, the display 108 and the housing and lens assembly 104 define the gap 252 separating the outer perimeter of the display 108 from the housing 240.

Figure 9:
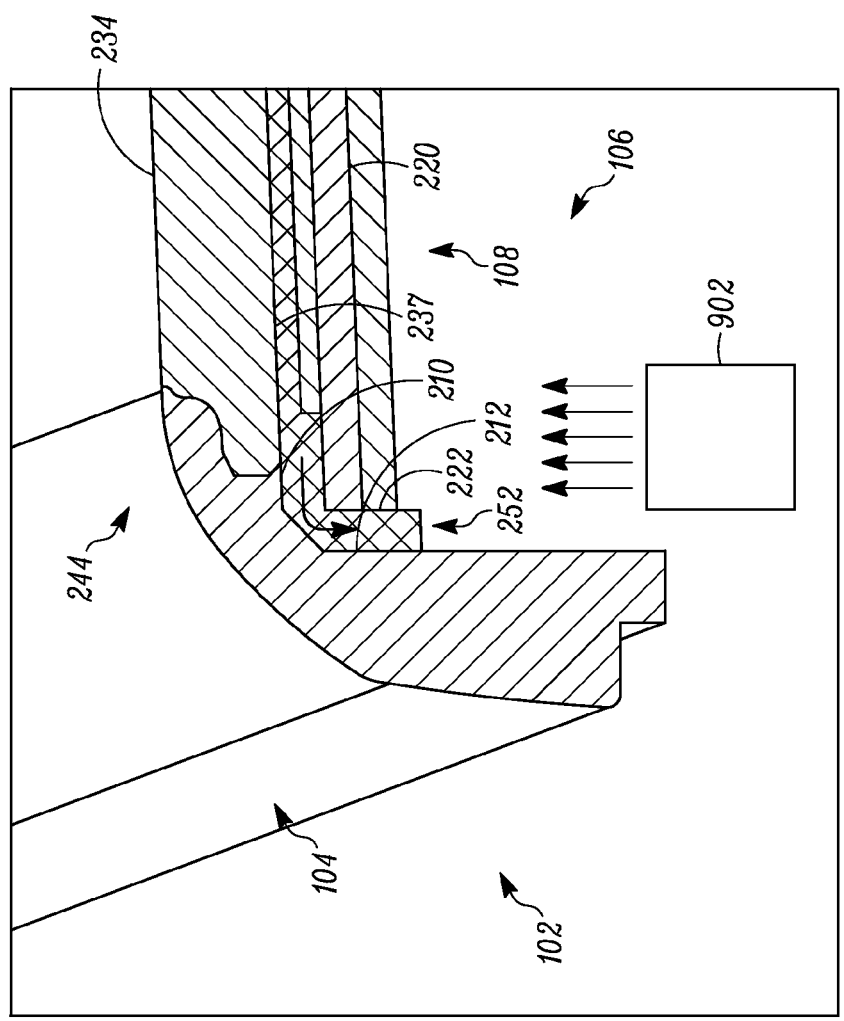
FIG. 9 is a perspective section view of a light source applying ultraviolet light to cure an overflow portion of an optically transparent resin of an portable electronic device display assembly.

At block 816, the housing and lens assembly 104 is displaced relative to the display 108 to engage the uncured optically transparent resin 210 against the lower surface 237 of the optically transparent lens 234. This action causes the resin 210 to "wet out" and flow toward the perimeter of the display 108 (specifically, the display panel outer perimeter 222). In addition, the perimeter portion 212 of the resin 210 flows into the gap 252 (see FIG. 9).

At block 818, the overflow portion 212 of the resin 210 is cured within the gap 252. In some embodiments, the overflow portion 212 is cured by applying an ultraviolet light curing treatment from a first ultraviolet light source 902 (see FIG. 9). The light source 902 may emit light into the internal chamber 106 of the housing and lens assembly 104. The light source 902 may emit light in a direction that is substantially perpendicular to the upper surface 244 of the portable electronic device display assembly 102 (that is, perpendicular within five degrees). In some embodiments, the light source 902 emits light in a substantially upward direction. Curing the overflow portion 212 facilitates initial tacking of the display 108 to the housing and lens assembly 104 and controls flow (specifically, overflow) of the optically transparent resin 210.

In some embodiments, the light emitted by the light source 902 passes through the frit 220 proximate the display panel outer perimeter 222. As such, the light cures a part of the upper portion 252 of the resin 210 disposed between the upper display panel 218 and the optically transparent lens 234 and aside the polarizing panel 228. Curing this part of the upper portion 252 facilitates initial tacking of the display 108 to the lens 234.

Figure 10:
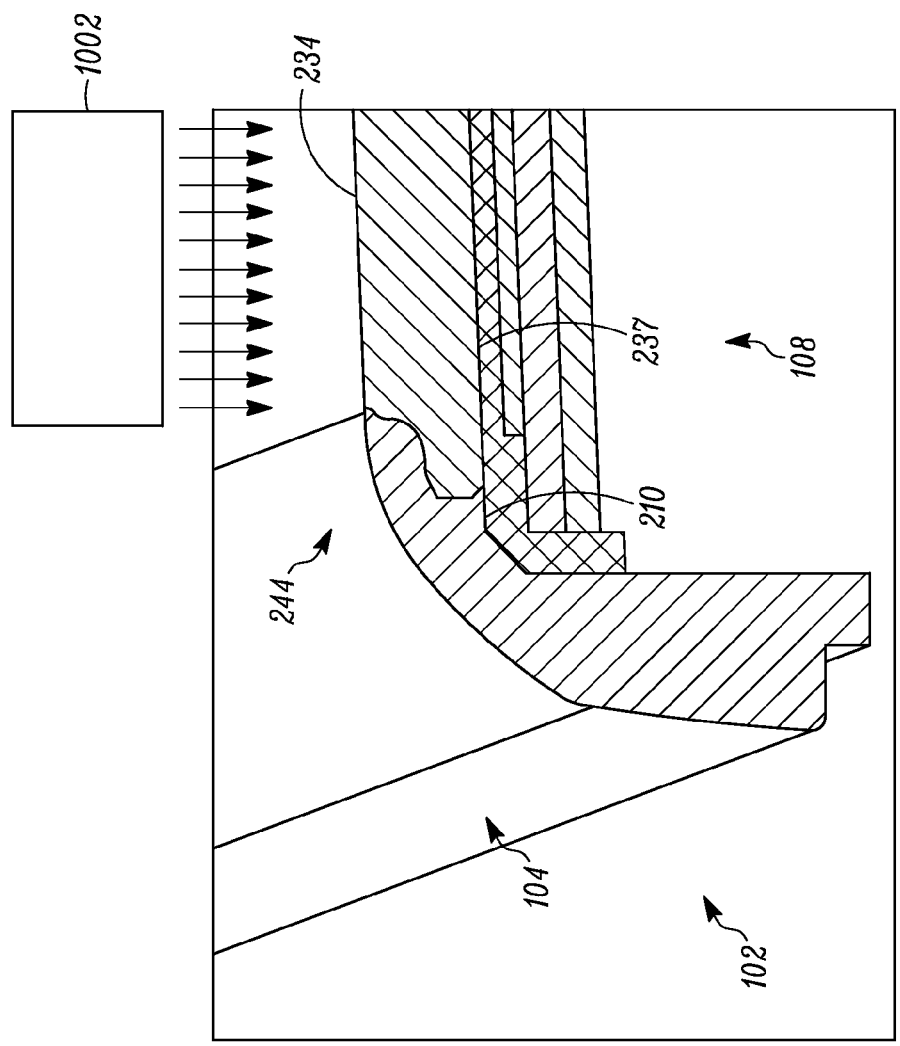
FIG. 10 is a perspective section view of a light source applying ultraviolet light to cure the remainder of the optically transparent resin of the portable electronic device display assembly of FIG. 9.

At block 820, the remainder of the uncured resin (for example, the upper portion 252 or part of the upper portion 252 of the resin 210), is cured. In some embodiments, the upper portion 252 is cured by applying an ultraviolet light curing treatment from a second ultraviolet light source 1002 (see FIG. 10). The light source 1002 may emit light above the upper surface 244 of the portable electronic device display assembly 102 and through the lens 234. The light source 1002 may emit light in a direction that is substantially perpendicular to the upper surface 244 of the portable electronic device display assembly 102 (that is, perpendicular within five degrees). In some embodiments, the light source 1002 emits light in a substantially downward direction.

Figure 11:
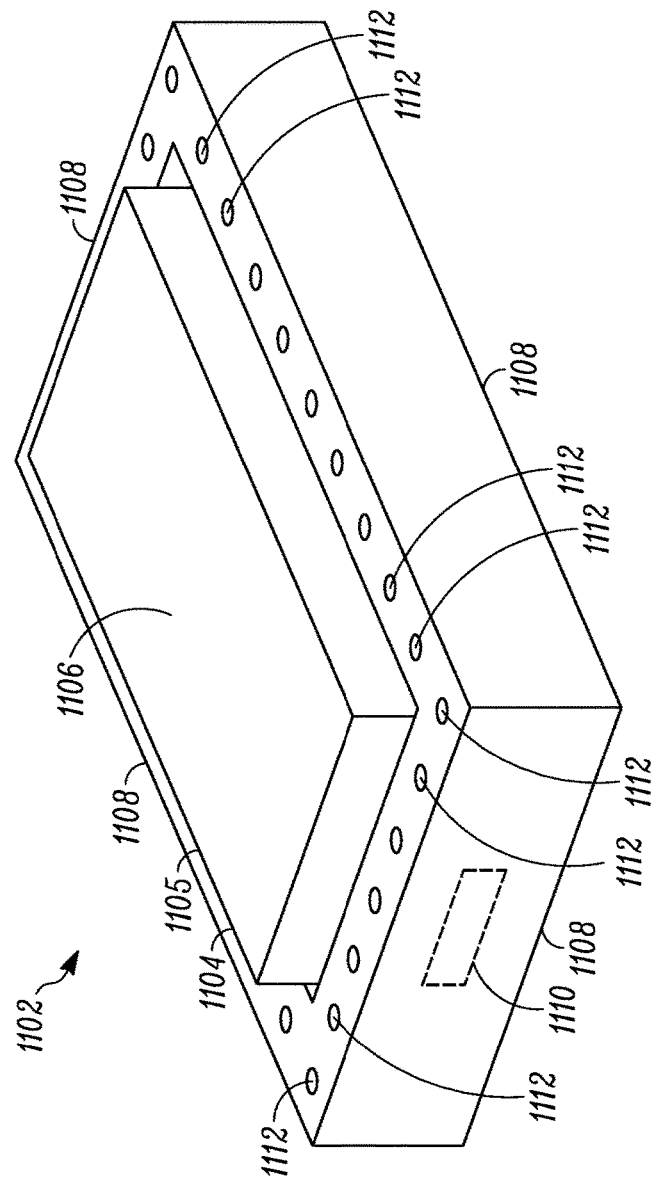
FIG. 11 is a perspective view of an example apparatus for curing an optically transparent resin within a portable electronic device display assembly.
Figure 12:
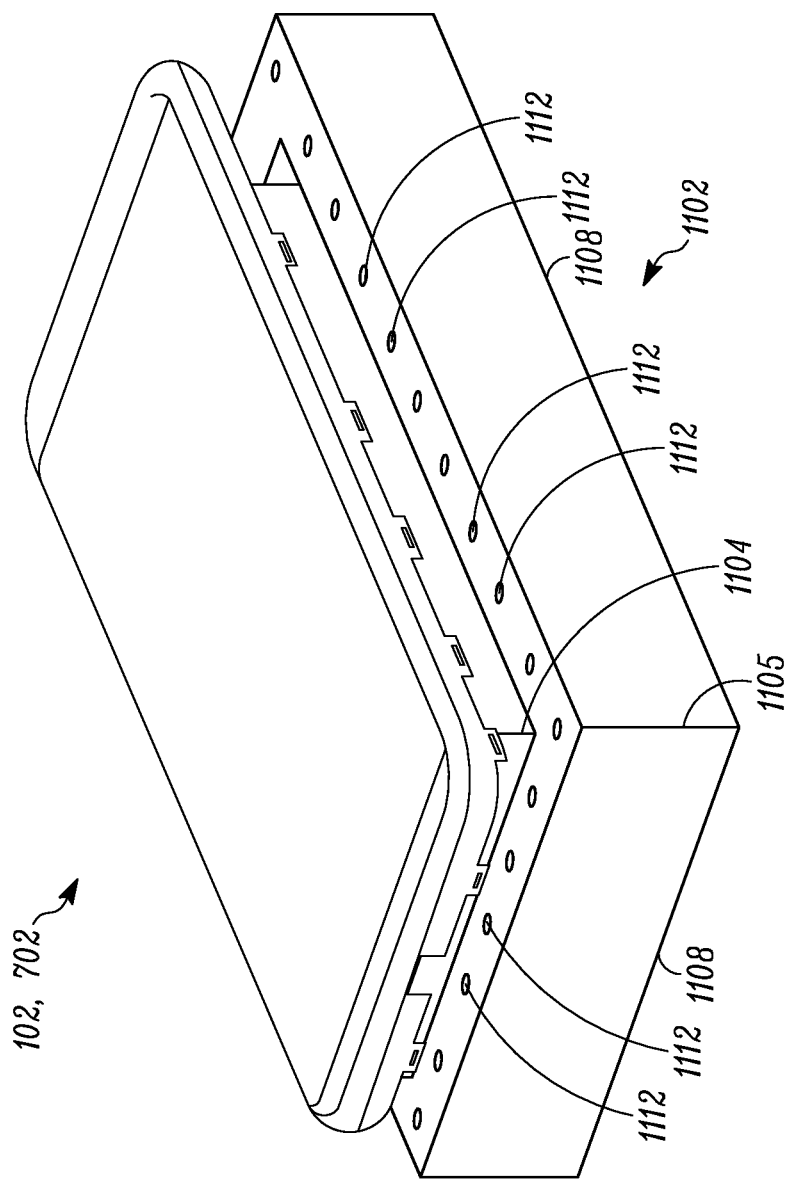
FIG. 12 is a perspective view of the apparatus of FIG. 11 supporting a portable electronic device display assembly.

FIGS. 11 and 12 illustrate an example apparatus 1102 for supporting portable electronic device display assemblies, such as the portable electronic device display assemblies 102 and 702, while performing the method described above. Specifically, the apparatus 1102 supports a portable electronic device display assembly 102 or 702 while aligning the display 108 relative to the housing and lens assembly 104 (block 812), positioning the display 108 and the uncured optically transparent resin 210 within the housing and lens assembly 104 (block 814), displacing the housing and lens assembly 104 relative to the display 108 to engage the uncured optically transparent resin 210 against the lower surface 237 of the optically transparent lens 234 (block 816), and curing the overflow portion 212 of the resin 210 within the gap 252 (block 818).

The apparatus 1102 includes a frame 1104 which may include any of various materials, such as plastics, metals, combinations thereof, and the like. The frame 1104 includes an inner fixture 1105 that in turn includes a support surface 1106. The frame 1104 and the inner fixture 1105 may be separate structures and permit relative movement with respect to each other. The support surface 1106 is adapted to support the portable electronic device display assembly 102 and 702 (specifically, the display 108). The frame 1104 also includes a set of side walls 1108 that surround the inner fixture 1105. In some embodiments and as shown in the figures, the frame 1104 may include four side walls 1108. The side walls 1108 carry one or more light sources 1110, such as the first ultraviolet light source 902 described above. The light source 1110 emits ultraviolet light through one or more openings 1112 defined by the side walls 1108. The openings 1112 direct light in a direction substantially perpendicular to the support surface 1106 (that is, perpendicular within five degrees) and toward the optically transparent resin 210 within the portable electronic device display assembly 102 or 702. In some embodiments, the openings 1112 direct light upwardly and toward the optically transparent resin 210 within the portable electronic device display assembly 102 or 702. In some embodiments, each opening 1112 includes a lens to direct light toward the portable electronic device display assembly 102 or 702.

Figure 13:
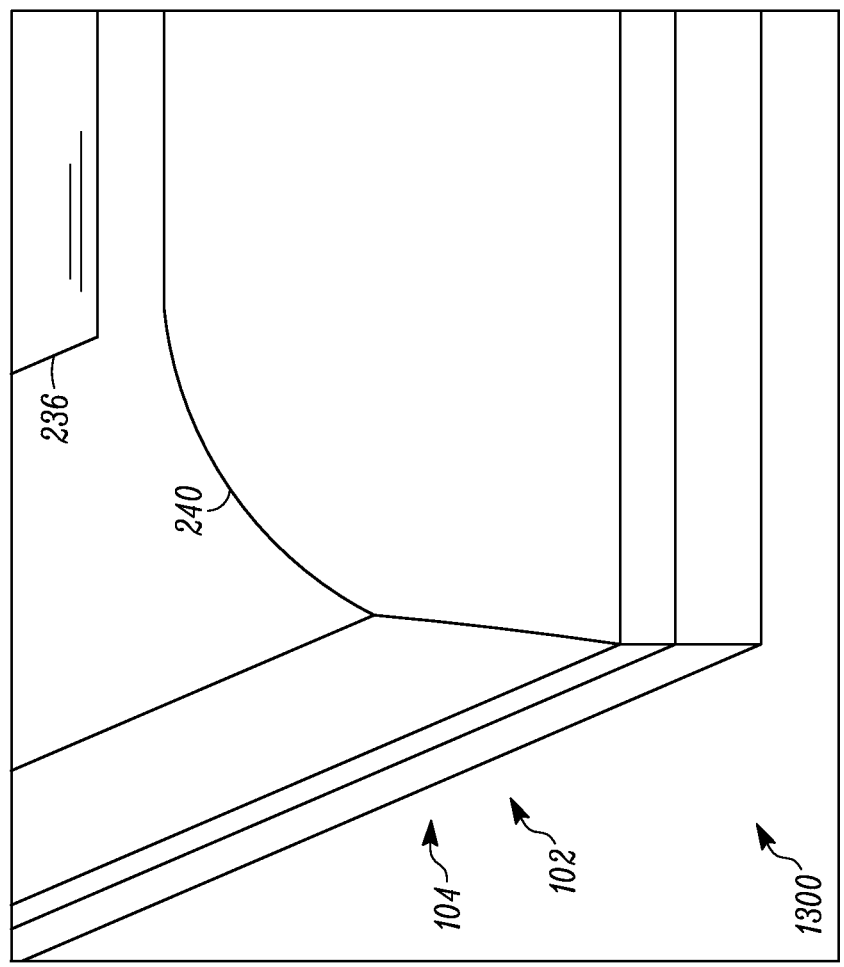
FIG. 13 is a partial perspective view of a portable electronic device including a display assembly.

FIG. 13 illustrates a partial perspective view of a portable electronic device 1300, such as a cellular telephone, that includes the portable electronic device display assembly 102 described above. In some embodiments, the portable electronic device 1300 alternatively includes the portable electronic device display assembly 702 described above. In some embodiments, the portable electronic device 1300 is manufactured according to the method described above.

Various other alternatives and modifications to the devices, methods, and apparatus described above are also contemplated. For example, a housing may include different combinations of the curved surfaces 250 and flat surfaces 750, 751 of the housings 240 and 740, respectively. In some embodiments, a housing may include two opposing sides with the curved surfaces 250 and two other opposing sides with the flat surfaces 751, 750. As another example, the number, shape, and dimensions of the side walls 1108 of the apparatus 1102 can be varied based on the size and shape of the portable electronic device display assembly 102 or 702. In some embodiments, the apparatus 1102 includes a single circular side wall 1108 if the portable electronic device display assembly 102 or 702 has a circular shape.

As used herein, "upper" and "lower", as well as other directional words, are used as a frame of reference for convenience of description, and correspond to the orientations shown in the illustrations in the accompanying drawings. They are not intended to be limiting or restrictive of the orientation of the components. For example, the "upper portion" and "lower portion" could alternately be referred to as the "front portion" and "back portion", or the "lower portion" and "upper portion", respectively.

The foregoing description has been presented for the purposes of illustration and description. It is not intended to be exhaustive or to limit the disclosure to the exemplary embodiments described above. Many modifications and variations are possible in light of the above teachings. It is intended that the scope of this disclosure be limited not by this detailed description of examples, but rather by the claims appended hereto.

What is claimed is:

1. A portable electronic device display assembly, comprising:
  a housing including:
    a first portion; and
    a second portion extending from the first portion, the first portion and the second portion, collectively, defining a curved outer surface of the housing;
  a display disposed within the housing such that a gap is disposed between the display and the curved outer surface of the housing defined by the first portion and the second portion, the display including at least one display panel, and a polarizing filter, the polarizing filter being disposed on the at least one display panel, the polarizing filter having an outer perimeter, the at least one display panel having an outer perimeter;
  an optically transparent lens disposed on the display, the first portion of the housing engaging with an outer perimeter of the optically transparent lens; and
  an optically transparent resin that couples the display to the optically transparent lens, the optically transparent resin including a perimeter portion disposed within the gap and between the outer perimeter of the at least one display panel and the second portion of the housing, the optically transparent resin including an upper portion disposed between the display and the optically transparent lens, wherein part of the upper portion of the optically transparent resin is disposed adjacent to the outer perimeter of the polarizing filter.

2. The portable electronic device display assembly of claim 1, wherein the outer perimeter of the polarizing filter is disposed inwardly from the outer perimeter of the at least one display panel.

3. The portable electronic device display assembly of claim 1, wherein the outer perimeter of the optically transparent lens is disposed outwardly from the outer perimeter of the polarizing filter.

4. The portable electronic device display assembly of claim 1, wherein the outer perimeter of the optically transparent lens is molded to the first portion of the housing.

5. The portable electronic device display assembly of claim 1, wherein the optically transparent resin includes at least one of acrylic-based resins and silicon-based resins.

6. The portable electronic device display assembly of claim 1, wherein the second portion of the housing includes a plurality of attachment members configured to couple with another housing component.

7. The portable electronic device display assembly of claim 1, wherein the perimeter portion of the optically transparent resin extends in a direction substantially perpendicular to the upper portion of the optically transparent resin.

8. The portable electronic device display assembly of claim 1, wherein the at least one display panel includes a first display panel and a second display panel, the first display panel being coupled directly to the second display panel.

9. A portable electronic device display assembly, comprising:
  a housing including a first portion and a second portion, the second portion of the housing extending from the first portion of the housing, the first portion and the second portion, collectively, defining a curved outer surface of the housing;
  an optically transparent lens disposed within the housing, the optically transparent lens including an outer perimeter, the outer perimeter being coupled to the first portion of the housing;
  a display disposed within the housing such that a gap is disposed between the display and the curved outer surface of the housing defined by the first portion and the second portion, the display including:
    a display panel adapted to present visual information to a device user, the display panel having an outer perimeter; and
    a polarizing filter disposed on a surface of the display panel, the polarizing filter including an outer perimeter disposed inwardly relative to the outer perimeter of the optically transparent lens; and
  an optically transparent resin coupling the display to the optically transparent lens, the optically transparent resin including a perimeter portion disposed within the gap and between the outer perimeter of the display panel and the second portion of the housing, the optically transparent resin including an upper portion disposed between the display and the optically transparent lens, wherein part of the upper portion of the optically transparent resin is disposed directly adjacent to the outer perimeter of the polarizing filter.

10. The portable electronic device display assembly of claim 9, wherein the outer perimeter of the optically transparent lens is disposed outwardly from the outer perimeter of the polarizing filter.

11. The portable electronic device display assembly of claim 9, wherein the first portion and the optically transparent lens define a continuous planar surface of the portable electronic device display assembly, the continuous planar surface extending from the curved outer surface of the housing.

12. The portable electronic device display assembly of claim 9, wherein the display panel is a first display panel, and the display also includes a second display panel directly coupled to the first display panel.

13. The portable electronic device display assembly of claim 9, wherein the optically transparent resin includes at least one of acrylic-based resins and silicon-based resins.

14. The portable electronic device display assembly of claim 9, wherein the second portion of the housing includes a plurality of attachment members configured to couple with another housing component.

15. The portable electronic device display assembly of claim 9, wherein the perimeter portion of the optically transparent resin extends in a direction substantially perpendicular to the upper portion of the optically transparent resin.

16. A portable electronic device, comprising:
- a display assembly including:
  - a housing including first portion and a second portion extending from the first portion, the first portion and the second portion, collectively, defining a curved outer surface of the housing, the second portion of the housing having a plurality of attachment members;
  - a display disposed within the housing such that a gap is disposed between the display and the curved outer surface of the housing defined by the first portion and the second portion, the display including a first display panel, a second display panel, and a polarizing filter, each of the first display panel, the second display panel, and the polarizing filter having an outer perimeter, the first display panel being directly coupled to the second display panel, the polarizing filter being disposed on a surface of the first display panel;
  - an optically transparent lens overlying the display, the optically transparent lens having an outer perimeter, the outer perimeter of the optically transparent lens being coupled to the first portion of the housing; and
  - an optically transparent resin coupling the display to the optically transparent lens, the optically transparent resin including a perimeter portion disposed within the gap and between the outer perimeter of the first and second display panels and the second portion of the housing, the optically transparent resin including an upper portion disposed between the display and the optically transparent lens, wherein part of the upper portion of the optically transparent resin is disposed adjacent to the outer perimeter of the polarizing filter at a location between the first display panel and the optically transparent lens.

* * * * *